(12) United States Patent
Weiss

(10) Patent No.: US 10,909,643 B1
(45) Date of Patent: Feb. 2, 2021

(54) PROPERTY VALUE DISPLAY SYSTEM AND METHOD

(71) Applicant: Market Shield Capital, LLC, Natick, MA (US)

(72) Inventor: Allan N. Weiss, Medfield, MA (US)

(73) Assignee: WEISS RESIDENTIAL RESEARCH LLC, Natick, MA (US)

( * ) Notice: Subject to any disclaimer, the term of this patent is extended or adjusted under 35 U.S.C. 154(b) by 758 days.

(21) Appl. No.: 14/102,469

(22) Filed: Dec. 10, 2013

Related U.S. Application Data

(60) Provisional application No. 61/767,073, filed on Feb. 20, 2013, provisional application No. 61/735,400, filed on Dec. 10, 2012.

(51) Int. Cl.
*G06Q 50/16* (2012.01)
*G06Q 30/02* (2012.01)

(52) U.S. Cl.
CPC ......... *G06Q 50/16* (2013.01); *G06Q 30/0278* (2013.01)

(58) Field of Classification Search
CPC .................................. G06Q 30/0278
See application file for complete search history.

(56) References Cited

U.S. PATENT DOCUMENTS

| | | | |
|---|---|---|---|
| 5,361,201 A * | 11/1994 | Jost | 705/35 |
| 8,660,919 B2 | 2/2014 | Kasower | |
| 9,105,061 B2 | 8/2015 | Eraker et al. | |
| 9,258,339 B2 | 2/2016 | Bastide et al. | |
| 9,361,583 B1 | 6/2016 | Holloway et al. | |
| 2002/0035520 A1 | 3/2002 | Weiss | |
| 2005/0288958 A1 * | 12/2005 | Eraker | G06Q 30/00 705/316 |
| 2006/0015357 A1 * | 1/2006 | Cagan | G06Q 30/0278 705/306 |
| 2006/0200383 A1 * | 9/2006 | Arutunian | G06Q 30/02 705/14.56 |
| 2007/0005383 A1 * | 1/2007 | Kasower | G06Q 30/00 705/1.1 |
| 2008/0126930 A1 * | 5/2008 | Scott | G06Q 10/109 715/702 |
| 2008/0183597 A1 | 7/2008 | Veerappan et al. | |
| 2009/0136155 A1 * | 5/2009 | Fuhrmann | G06Q 30/06 382/284 |
| 2011/0218934 A1 * | 9/2011 | Elser | G06Q 40/02 705/36 R |
| 2012/0013619 A1 * | 1/2012 | Brath | G06T 11/206 345/441 |
| 2013/0132287 A1 | 5/2013 | Yao et al. | |
| 2013/0282524 A1 | 10/2013 | Appolito et al. | |
| 2013/0305167 A1 | 11/2013 | Bastide et al. | |

(Continued)

FOREIGN PATENT DOCUMENTS

WO   WO-2009064283 A1 * 5/2009 ............ G06Q 30/02

*Primary Examiner* — Julie M Shanker
(74) *Attorney, Agent, or Firm* — Onello & Mello, LLP

(57) ABSTRACT

Provided is a provided is a computer-based system, including computer processors and computer storage media, configured to display property value data over a period of time—to dynamically show changes in one or more markets via a display. The system can implement a method of dynamically displaying property price (or value) data over time. User interaction mechanisms can be provided to enable the user to interact with the display and data.

17 Claims, 7 Drawing Sheets

(56) References Cited

U.S. PATENT DOCUMENTS

| | | |
|---|---|---|
| 2013/0339094 A1 | 12/2013 | Berry et al. |
| 2013/0346151 A1 | 12/2013 | Bleakley et al. |
| 2014/0304178 A1 | 10/2014 | Bengson et al. |
| 2015/0235331 A1 | 8/2015 | Hunt et al. |

* cited by examiner

AVM: $315,000

| Price | Estimated Time on Market |
|---|---|
| $300,000 | 6 – 8 Weeks |
| $325,000 | 8-10 Weeks |
| . | . |
| . | . |
| . | . |

*FIG. 3A*

AVM: $315,000

| Price | When | Estimated Time on Market |
|---|---|---|
| $315,000 | May – June | 6 – 8 Weeks |
| $315,000 | July - Aug | 8-10 Weeks |
| . | . | . |
| . | . | . |
| . | . | . |

*FIG. 3B*

PROPERTY VALUE DISPLAY SYSTEM AND METHOD

CROSS REFERENCE TO RELATED APPLICATIONS

This application claims the benefit of priority under 35 U.S.C. § 119(e) from commonly owned Provisional Patent Application 61/767,073, entitled Property Value Display System and Method, filed on Feb. 20, 2013 in the United States Patent & Trademark Office (USPTO) and U.S. Provisional Patent Application 61/735,400, entitled Property Valuation System and Method and Property Display System and Method, filed on Dec. 10, 2012 in the USPTO, the disclosures of which are incorporated herein by reference in their entireties.

FIELD OF INTEREST

The present inventive concepts relate to the field of property valuations, and more particularly to the field of property valuations and various manners of using and displaying property valuation information, e.g., including, but not limited to, system and methods for property value trend analysis.

SUMMARY OF INVENTION

In accordance with the present inventive concept, provided is a provided is a computer based system, including computer processors and computer storage media, configured to display property value data over a period of time—to dynamically show changes in one or more markets. The system can implement a method of dynamically displaying property price (or value) data over time.

The display can implement a display paradigm, where different colors are used to show price change volatility over time. A display paradigm can also be related to shapes associated with the properties, where different shapes can be used to reflect properties having different characteristics.

User interactive mechanisms can be provided to enable the user to select markets, micro markets, and/or individual properties for display of price trend and volatility data.

The system and method can include capabilities to predict further property price values for selected markets, micro markets, and/or individual properties.

The system and method can apply pattern recognition algorithms as an approach to interpret property price/value data, and to make predictions and forecasts regarding future property prices/values.

The system and method can provided a single comprehensive view of a plurality of indices or a single index, e.g., related to or reflecting property price/value activity over time.

In accordance with one aspect of the invention, provided is a property valuation and display (PVD) system, comprising: an interface to at least one computer network; at least one computer processor and computer storage media; and a set of functional modules stored as computer program code in the computer storage media that are executed by the at least one computer processor, including a property valuation and display module executable to: process property sales, value, or both data received over the at least one computer network for at least one real estate market to generate a PVD display of dynamically changing property value data as it changes over time, including graphically representing property value trends in the at least one real estate market with graphically changing indicia.

In some embodiment, the PVD display can be a user interactive display.

In some embodiment, the PVD display includes a graphically depicted map and at least some of the dynamically changing property value data is overlaid on the map.

In some embodiment, the dynamically changing property value data includes price change volatility and different colors are used to represent different price change volatilities over time.

In some embodiment, the PVD display represents properties having different characteristics with different shapes.

In some embodiment, the property valuation and display module is responsive to user inputs and the PVD display includes a set of user interactive mechanisms configured to enable the user to select at least one of one or more real estate markets, micro markets, and an individual property or properties for display with associated price trend and price volatility data.

In some embodiment, the property valuation and display module is configured to predict future property price values for at least one of one or more selected markets, micro markets, and individual property or properties.

In some embodiment, the property valuation and display module is configured to apply pattern recognition algorithms to interpret received property sales, value, or both data, and to make predictions and forecasts regarding future property prices, values, or both based thereon.

In some embodiment, the property valuation and display module is configured to provide a single comprehensive view in the PVD display of a plurality of indices or a single index reflecting property price, value, or both activity over time.

In accordance with another aspect of the invention, provided is a property valuation and display (PVD) method, executable by a PVD system comprising an interface to at least one computer network, at least one computer processor and computer storage media, and a set of functional modules stored as computer program code in the computer storage media that are executed by the at least one computer processor, including a property valuation and display module executable to perform a PVD method comprising: processing property sales, value, or both data received over the at least one computer network for at least one real estate market; and generating a PVD display of dynamically changing property value data as it changes over time, including graphically representing property value trends in the at least one real estate market with graphically changing indicia.

In some embodiment, the method can include generating the PVD display as a user interactive display.

In some embodiment, the method can include generating the PVD display includes graphically depicting map and overlaying at least some of the dynamically changing property value data on the map.

In some embodiment, the method can include the dynamically changing property value data including price change volatility and the method including using different colors to represent different price change volatilities over time.

In some embodiment, the method can include the PVD display represents properties having different characteristics with different shapes.

In some embodiment, the method can include the PVD display being responsive to user inputs, and generating the PVD display to include a set of user interactive mechanisms enabling a user to select at least one of one or more real estate markets, micro markets, and an individual property or properties for display with associated price trend and price volatility data.

In some embodiment, the method can include the PVD module predicting future property price values for at least one of one or more selected markets, micro markets, and individual property or properties.

In some embodiment, the method can include the PVD module applying pattern recognition algorithms to interpret received property sales, value, or both data, and to predict and forecast regarding future property prices, values, or both based thereon.

In some embodiment, the method can include the PVD module providing a single comprehensive view in the PVD display of a plurality of indices or a single index reflecting property price, value, or both activity over time.

Other such functions and functionality can be included that would reasonably flow from the system and methods described herein, as would be understood by those skilled in the art.

BRIEF DESCRIPTION OF THE DRAWINGS

The present invention will become more apparent in view of the attached drawings and accompanying detailed description. The embodiments depicted therein are provided by way of example, not by way of limitation, wherein like reference numerals refer to the same or similar elements. The drawings are not necessarily to scale, emphasis instead being placed upon illustrating, aspects of the invention. In the drawings:

FIGS. 3A and 3B are embodiments of other display screens that could be generated by the system of FIG. 1, according to aspects of the invention concept.

DETAILED DESCRIPTION OF PREFERRED EMBODIMENTS

Figure 1:
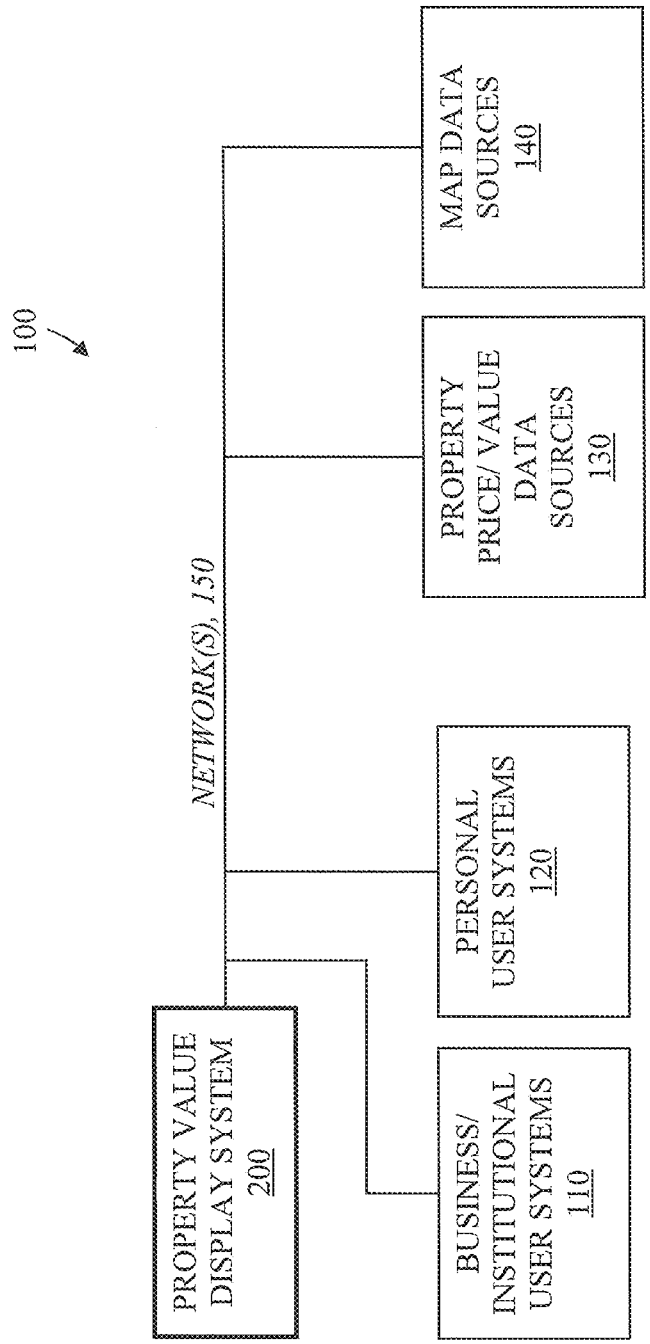
FIG. 1 is a block diagram of an embodiment of property value display computer system, according to aspects of the invention concept.

Various exemplary embodiments will be described more fully hereinafter with reference to the accompanying drawings, in which some exemplary embodiments are shown. The present inventive concept may, however, be embodied in many different forms and should not be construed as limited to the exemplary embodiments set forth herein.

It will be understood that, although the terms first, second, etc. are be used herein to describe various elements, these elements should not be limited by these terms. These terms are used to distinguish one element from another, but not to imply a required sequence of elements. For example, a first element can be termed a second element, and, similarly, a second element can be termed a first element, without departing from the scope of the present invention. As used herein, the term "and/or" includes any and all combinations of one or more of the associated listed items.

It will be understood that when an element is referred to as being "on" or "connected" or "coupled" to another element, it can be directly on or connected or coupled to the other element or intervening elements can be present. In contrast, when an element is referred to as being "directly on" or "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, steps, operations, elements, and/or components, but do not preclude the presence or addition of one or more other features, steps, operations, elements, components, and/or groups thereof.

As will be understood by those skilled in the art, the present invention can be implemented in a computer system (or "system") that comprises at, least one computer processor, computer storage devices (e.g., hard drives, volatile memory, non-volatile memory).

To the extent that functional features, operations, and/or steps are described herein, or otherwise understood to be included within various embodiments of the inventive concept, such functional features, operations, and/or steps can be embodied in functional blocks, units, modules, operations and/or methods. And to the extent that such functional blocks, units, modules, operations and/or methods include computer program code, such computer program code can be stored in a computer readable medium, e.g., such as non-transitory memory and media, that is executable by at least one computer processor.

Figure 2:
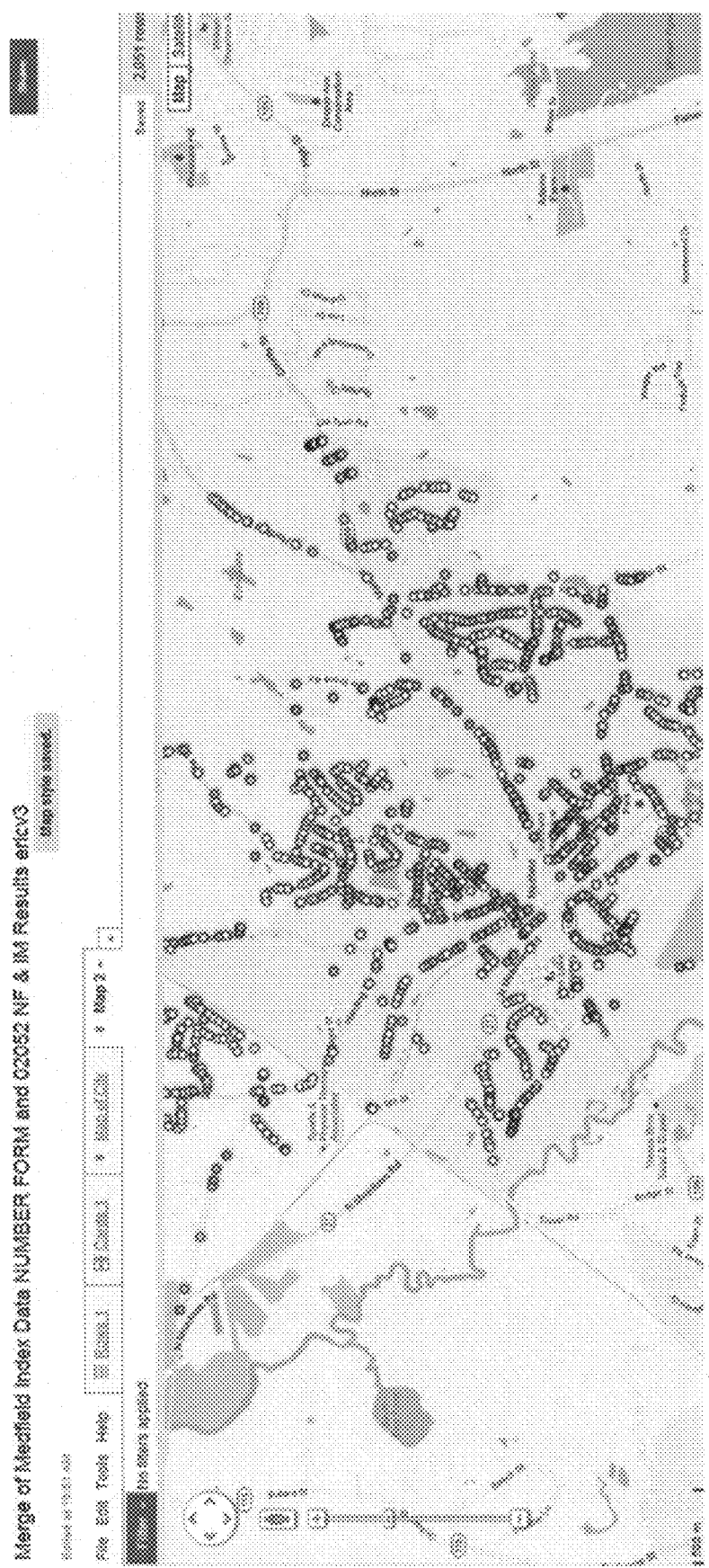
FIG. 2 is an embodiment of a display screen that could be generated by the PVD system of FIG. 1, according to aspects of the invention concept.

FIG. 1 is a block diagram of an embodiment of property value display computer system, according to aspects of the invention concept. FIG. 2 is an embodiment of a display screen that could be generated by the system of FIG. 1, according to aspects of the invention concept. FIGS. 3A and 3B are embodiments of other display screens that could be generated by the system of FIG. 1, according to aspects of the invention concept. FIGS. 4A-D are embodiments of displays screen that could be generated by the system of FIG. 1, according to aspects of the invention concept.

FIG. 1 shows an embodiment of a system of networked computers 100 that includes a property value display (PVD) system 200, in accordance with aspects of the inventive concept. Each computer or system in the network of computers 100 includes one or more computer processors and storage devices and media. The PVD system 200 is configured to transform price and/or market data to a set of static and/or dynamically changing price trend data, such that a tangible, interactive display of the same is provide in conjunction with a map depicting a representation of the real (e.g., physical, geographical) world.

The PVD system 200 includes a set of functional modules stored as computer program code in the computer storage media that are executed by at least one computer processor, including a price value display module executable module that is executable to process property sales data received over the at least one computer network for at least one real estate market to generate for display dynamically changing property value data as it changes over a period of time, including graphically representing property value trends in the at least one real estate market with graphically changing indicia.

The PVD system 200 can be configured to determine and display property (or real estate) values via a display of an electronic device. The display can make evident changes in values, and price trends, over time. The "property" can include one or more of homes, commercial real estate, and/or plots of land, as examples. With respect to "homes," the property could be single family homes, multi-family homes, condos, and/or cooperatives, as examples. The property could alternatively and/or additionally include residential rental properties, such as apartments, rooms for rent, vacation rentals, and/or hotel rooms, and/or commercial property for rent, or any other type of property for rent.

The granularity of the display can be adjustable by the user through user interaction with the PVD system 200. Such user interaction could take the form of text (e.g., type), voice, or screen interaction, as examples.

In the embodiment of FIG. 1, the PVD system 200 can access and/or be accessed by one or more other systems via one or more networks 150. As examples, network(s) 150 can include, but are not limited to, the Internet, the Worldwide Web, intranets, extranets, virtual private networks, and electronic social networks. As examples, the PVD system 200 can access and/or be accessed by business/institutional systems 110, personal user systems 120, property price/value data sources (or systems) 130; and map data sources (or systems) 140.

Business/institutional systems 110 can include systems of government, educational, and/or business entities involved in the purchasing, renting, brokering, listing (offering), financing, insuring, underwriting, investing in, researching, reporting on, and constructing/maintaining/servicing such properties and relevant markets, as examples.

Personal user systems 120 can include systems of personal, private, non-commercial, and/or individual entities involved in the selling, purchasing, evaluating, and researching such properties and relevant markets, as examples.

Property price/value data sources (or systems) 130 can include any one or more of a number of public or private (e.g., licensed) data sources that provide property price, or from which such price is determinable by alone or in combination with other information from other sources. As examples, such sources could include information electronically retrievable from one or more of various registries of deeds, automated valuation systems, listing services, sales information systems, and government reporting agencies or bureaus, as examples.

Map data sources (or systems) 140 can include any one or more of a number of public or private (e.g., licensed) sources of map data. As examples, such sources can include Google Maps, MapQuest, and others. Such map data should include or enable location of a property by street address and/or city/town, state, and zip code, as examples.

FIG. 2 is an embodiment of a display screen that could be generated by the PVD system 200 of FIG. 1, according to aspects of the invention concept. In this embodiment, each house has its own representation, shown as a colored circle. Users can zoom in and out—at their discretion—to get a better view of market segments or micro markets. As discussed below, the colors represent different information with respect to price changes over time.

In an illustrative embodiment, every house is unique and is situated in a market comprised of a continuum of homes that are more or less like it across many important dimensions, such as age, size, style, lot size and value, as examples. The demand for each house is a function of where the house sits within the continuum of these traits along with its unique location. The market forces shaping the changing value of each house through time can also be represented as a continuum of forces in a multi-dimensional surface with houses that are nearby in one or more dimension moving to a degree in sympathy with any given house. Therefore, if there can be presented a depiction of the changing value of a house through time, along with depictions of all of the nearby houses one can see a gradually changing landscape across these many dimensions as well as through time.

If a rate of price change (such as quarterly or monthly) is represented by a shading of a color (e.g. darker red for declining faster and darker green for rising faster) and each house is shown on a map with its color, then each house can function as one pixel (or discrete set of pixels) and one will immediately (e.g., visually) be able to make out physical areas that are tending to move in value together with some sharp delineations, perhaps created by a town boundary and other areas where the rate of change and, therefore, the color is more homogenous or change more gradually.

The rate at which prices are changing in turn changes through time, like a car speeding up or slowing down, and these changes in rate of change can be depicted by bringing the dimension of time into the display, thereby showing the state of the market in a sequence of frames, e.g., each frame showing the rate of price change per house within a given time frame or portion of a given time frame, such as monthly or quarterly. If these frames are displayed at regular intervals, one will see the market gradually changing, e.g., from green to red and then back to green, as a price drop ripples though a market and then, the market recovers.

In addition, this display can show which houses and, therefore, micro markets are affected earliest and most severely by a decline and which enjoy a recovery earliest and most significantly. Certain houses, micro markets and other geographic delineations, will immediately be visible without necessarily imposing artificial delineations, such as towns, counties or metro areas, because the houses themselves, given they are reacting similarly to their market neighbors, will become represented by the pixels that show the real market forces acting upon the houses dispersed across the map. These moving depictions can help people see trends in nearby markets begin to approach their own market and, therefore, serve as a forecast of market developments. If these frames are updated on a frequent basis (e.g., in real-time), then people can watch the market as it functions and see the physical shape and how the physical shape, size and color are changing through time—much like watching a changing weather map. The frames can be updated using time lapsed imaging, over regular intervals, which could be user-selectable.

The house level market view is quite different than the view provided by existing home price indexes that statically depict defined markets, such as towns, counties or metro areas. Since these existing indexes are organized by presumed market definitions, they force a market definition on the information—rather than depict the organically functioning market as it actually is. Therefore, these existing indexes and depictions cannot accurately show trends in segments of the defined market or that lie partly in one defined area and party in another. There is no opportunity to see the shadings between or within markets or the counter currents that may be at work, but rather only the average or typical price change. Therefore, the texture and most of the information is not available through these market imposed indexes and market depictions.

It should also be noted that the user can specify to only display houses within a certain size, value, age or other range, perhaps the range within which it is considering buying. Within such a range, the houses with the lower size (or age, or value) could be one shape (e.g. triangle), those in the middle could be another (square) and the top third could be another (circle). This way the user could see how well, for example, the smaller houses are doing in terms of price change relative to the middle of the pack and the larger ones, which could help then decide which part of the range to focus on. The display could be zoomed in to help the user decide which street seems to be doing the best or zoomed out to show which towns that have the types of houses they want are doing to help them decide which towns to focus on, for example.

There could also be provided "movies" (e.g., a series of frames showing changes over time in prices) at difference geographic levels and type ranges pointing out what to look for (such as street that is turning more dark green or towns that were less changeable during the last downturn (have more price stability.)

The PVD system 200 can also be adapted to predict present and/or future house values/prices on a house-by-house basis, or for one or more sets of houses. Such predictions can be shown and displayed using the same color and/or shape paradigms discussed above, or other such paradigms.

In accordance with aspects of the inventive concept, the PVD system 200 may be configured to obtain user input, such as through a computer interface, from someone seeking to purchase a house. The input could provide purchase property criteria, which could include, as examples, one or more of location, size, number of bedrooms, price range, and so on. The results could be displayed showing upward and/or downward price volatility for one or more properties.

In accordance with aspects of the inventive concept, the system may be further configured to do an automatic search of properties for sale, e.g., for properties having a relatively favorable price trend. Such search results are also preferably filtered according to the purchase property criteria, and are displayed according to the above discussed display paradigms, or the like.

In accordance with aspects of the inventive concept, the PVD system 200 may be further configured to provide an email (or text) notification if a house comes on the market that is a good deal according to their criteria and is favorable with respect to market trends and/or lack or downward volatility. A real-time, or near real-time, email (or text) notification would allow the buyer to move quickly to look at the house and possibly make an offer prior to other potential buyers, thereby giving the buyer are higher likelihood of purchasing a good deal.

In accordance with aspects of the inventive concept, the PVD system 200 may be further configured to, for home sellers, provide a scale that shows the likely selling time for a range of asking prices. For example, selling time could be estimated at 6-8 weeks if the house is put on the market for $300,000 and 8 to 10 weeks if the asking price is $325,000. The selling estimator could also take into account timing for putting a house on the market—since the real estate market typically will be busy at some times of year than it is at other times of year.

In accordance with aspects of the inventive concept, the PVD system 200 may be further configured to produce home price indexes that measures the changing value of a house or houses through time (e.g. +10% in the past year).

In accordance with aspects of the inventive concept, the PVD system 200 may be further configured to combine with a houses for sale listing service, wherein a potential seller can enter the price they wish to get on the house. If the entered price is higher than current market value, the system could look at home price trends to estimate when the seller are likely to be able to put the house on the market at that price with a reasonable expectation that they could sell the house for at least the desired price. Another parameter that could be considered is time on market, i.e., the seller could enter not only price but also preferred time on market (weeks). Additionally, or alternatively, even without seller input, the system could generate estimates of different times the house could be put on the market and how long it should likely take to sell if put on at the seller price at the different times.

In various embodiments, one or more of the following views may be generated and displayed as a transformation of real property and map data. FIGS. 4A-D are embodiments of displays screen that could be generated by the PVD system 200 of FIG. 1, according to aspects of the invention concept, and represent examples of Views I-IV below.

Figure 4A:
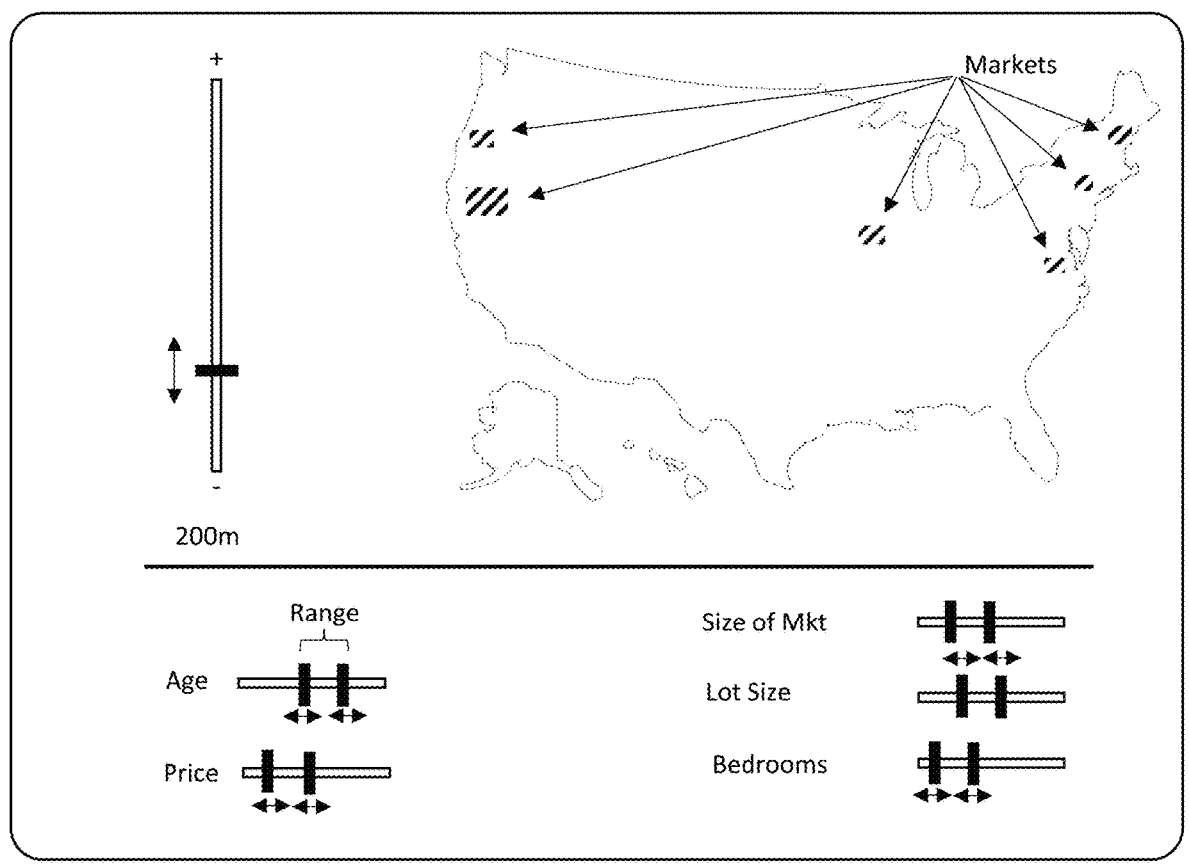
FIGS. 4A-D are embodiments of displays screen that could be generated by the system of FIG. 1, according to aspects of the invention concept.

View I—FIG. 4A

According to this display view, a user is graphically presented with a map of, for example, the US (or a portion thereof). There can be provided graphical mechanisms (e.g., sliders) displayed to set: (1) a range of market strength the user wants to view; (2) a size of market the user wants to view (e.g., number of houses the user could realistically buy within a year within the strength requirements), and/or (3) a radius of all the houses the user could buy within that market.

Also sliders (or other graphical mechanisms) for selecting or setting a parameter for a desired age of houses (range), a price range, a size range, and/or a lot range, as examples, could be provided. Sliders (or other graphical mechanisms) for selecting or setting other parameters relevant to real estate property ownership could also be provided. The various parameters could define a set of criteria used for identifying particular markets, regions, neighborhoods, properties, and/or the like on a graphical representation of map.

The graphical representation of the map could show circles (or other shapes) centered on the markets that meet the set criteria. The size of the circle (or its radius) could represent how spread out the houses are that meet the criteria within the market. The color could represent a strength of the sub-markets. The darkness or hue could represent a numbers of houses in each strength category.

Figure 4B:
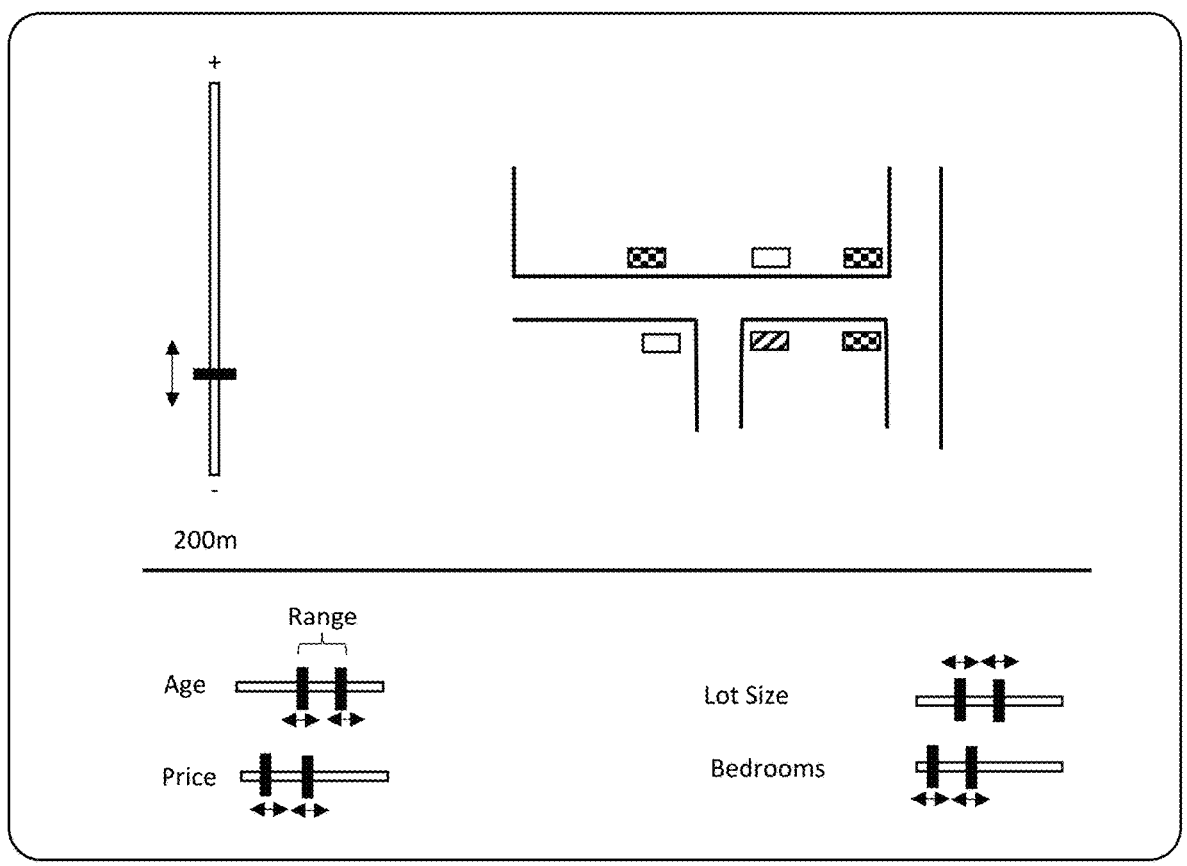

View II—FIG. 4B

The display could include mechanisms to enable the user to zoom in and out on a market (e.g. Phoenix). The view could display actual houses color coded (e.g., with dots) by market strength. The view could provide user interactive mechanisms, such as sliders, for different relevant property parameters, e.g., age range, price range, size range, lot range, and so on.

Figure 4C:
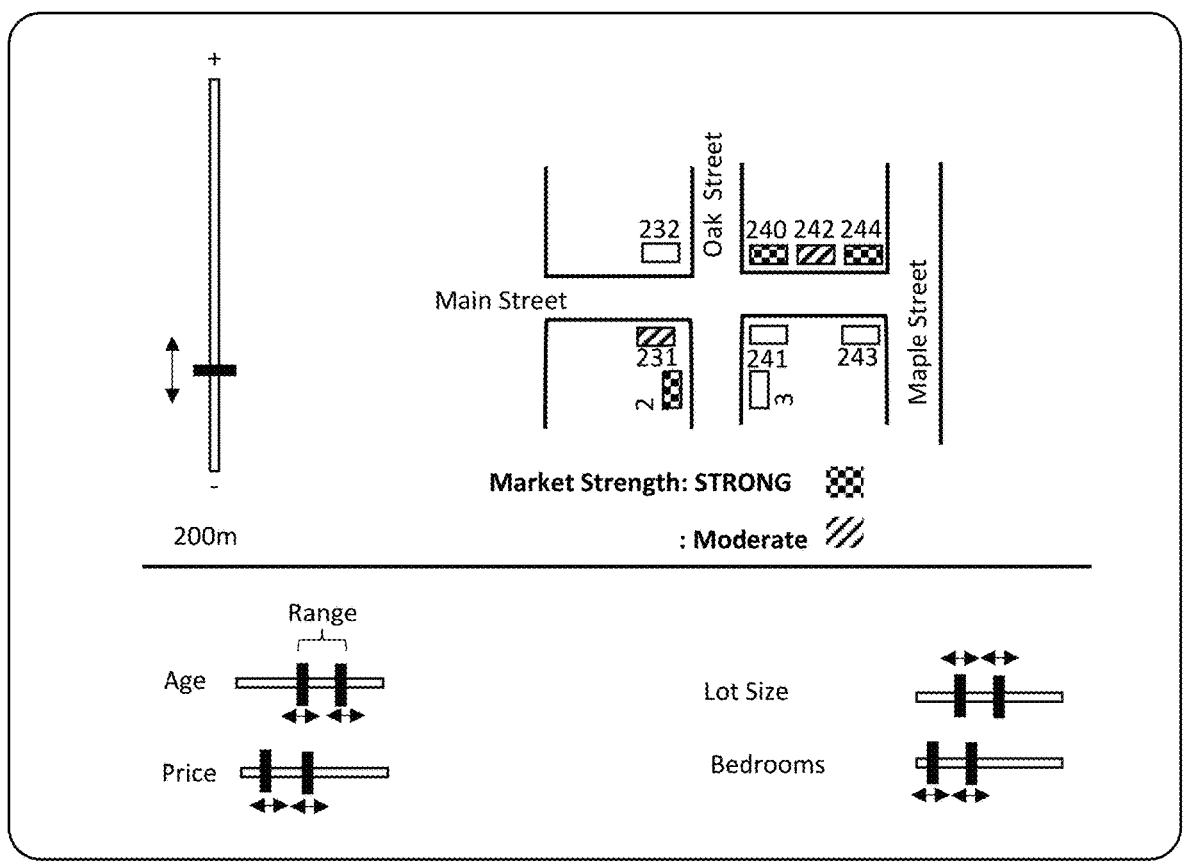

View III—FIG. 4C

The display could enable a rendering of actual addresses, as well as price, age, and size ranges for various levels of market strength, as examples.

A definition of market strength, as used herein, can be: rate of change now and rate of acceleration (second derivative).

The display may also be to set to show price change over a defined history or time period.

The display may also include a "movie mode," which could show the colors changing through time as prices change.

Figure 4D:
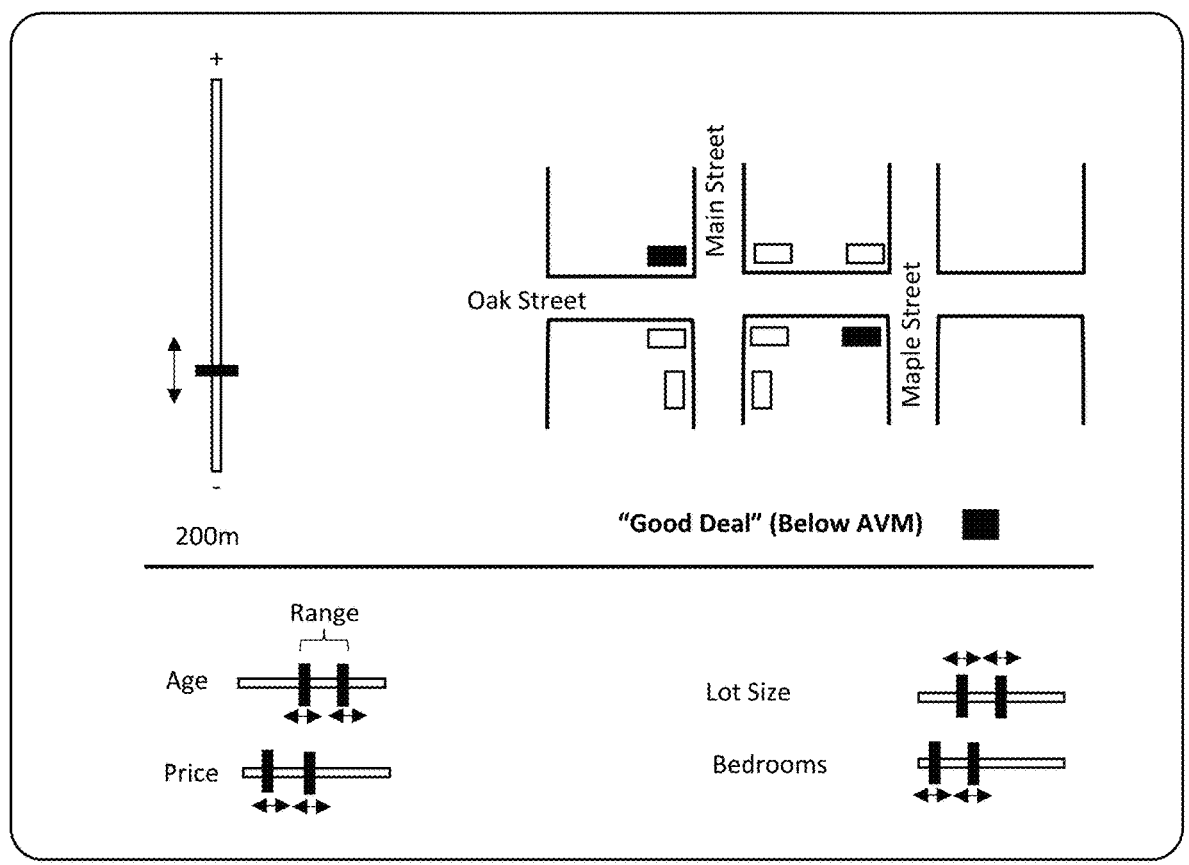

View IV—FIG. 4D

The display could include mechanisms that map the houses on the market by how good a deal they are or their strength with respect to market volatility over time. This could be set to real time or for a defined period, e.g., so a user could watch houses changing in real time as houses come on and off the market and asking prices change versus real value, or over a defined period.

While the foregoing has described what are considered to be the best mode and/or other preferred embodiments, it is understood that various modifications can be made therein and that the invention or inventions may be implemented in various forms and embodiments, and that they may be applied in numerous applications, only some of which have been described herein. It is intended by the following claims to claim that which is literally described and all equivalents thereto, including all modifications and variations that fall within the scope of each claim.

What is claimed is:

1. A real property value change and volatility display system, comprising:
   at least one processor configured to:
      electronically access at least one data storage media or system comprising map data and comprising property price data associated with a plurality of real properties that are individually identified;
      in response to a user input, determine a property value change for each of a plurality of individual properties in a market for a plurality of time intervals based on the property price data;
      generate a computer display that individually represents each property value change for each of the individual properties within the market with a pixel or a discrete set of pixels superimposed on a map for each time interval,
      wherein the at least one processor is configured to cause the computer display to dynamically change a color of the pixel or discrete set of pixels representing each of the individual properties to display value change and volatility on an individual property basis over the plurality of time intervals within the market; and
      graphically represent property value trends in the market with graphically changing indicia.

2. The system of claim 1, wherein the at least one processor generates the display as a user interactive display.

3. The system of claim 1, wherein the time intervals are graphically represented as a sequence of frames rendered over time, each frame showing the rate of value change of each of the real properties.

4. The system of claim 1, wherein the change in color of the pixel or discrete set of pixels representing the individual property is graphically depicted by different colors and/or different color shading used to represent different value change volatilities over time.

5. The system of claim 1, wherein the display represents the one or more real properties having different characteristics with different shapes.

6. The system of claim 1, wherein the display includes a set of user interactive mechanisms configured to enable a user to select a geographic area comprising the one or more real properties and the map.

7. The system of claim 1, wherein each real property is a house.

8. The system of claim 1, wherein each real property is graphically represented as a single pixel.

9. A computer-implemented method of generating real property value change and volatility display, comprising:
   at least one processor:
      electronically accessing at least one data storage media or system comprising map data and comprising property price data associated with a plurality of real properties that are individually identified;
      in response to one or more user input:
         determining a property value change for each of a plurality of individual properties in a market for a plurality of time intervals based on the property price data;
         generating a computer display that individually represents each property value change for each of the individual properties with a pixel or a discrete set of pixels superimposed on a map for each time interval, including:
            causing the computer display to dynamically change a color of the pixel or discrete set of pixels representing each of the individual properties to display value change and volatility on an individual property basis over the plurality of time intervals within the market; and
         graphically representing property value trends in the market with graphically changing indicia.

10. The method of claim 9, including generating the display as a user interactive display.

11. The method of claim 9, wherein the time intervals are graphically represented as a sequence of frames over time, each frame showing the rate of value change of each of the real properties.

12. The method of claim 9, wherein the graphically changing the color of the pixel or discrete set of pixels representing the individual property includes depicting different colors and/or color shading to represent different value change volatilities over time.

13. The method of claim 9, wherein the method includes representing the one or more real properties having different characteristics with different shapes.

14. The method of claim 9, including:
   the display being responsive to user inputs; and
   generating the display includes generating a set of user interactive mechanisms enabling a user to select a geographic area comprising the one or more real properties and the map.

15. The method of claim 9, wherein each real property is a house.

16. The method of claim 9, including graphically representing each real property by a single pixel.

17. A computer-implemented method of displaying real property value change and volatility, comprising:
   at least one processor:
      electronically accessing at least one data storage media or system comprising map data and comprising property price data associated with a plurality of real properties that are individually identified; and
      in response to one or more user input:
         determining a property value change for each of a plurality of individual properties in a market for a plurality of time intervals based on the property price data;
         generating a computer display that individually represents each property value change for each of the individual properties with a pixel or a discrete set of pixels superimposed on a map for each time interval; and causing the computer display to dynamically change a color of the pixel or discrete set of pixels representing each of the individual properties to display value change and volatility on an individual property basis over the plurality of time intervals within the market.

\* \* \* \* \*